United States Patent
Tomita et al.

[19]

[11] Patent Number: 5,863,568
[45] Date of Patent: Jan. 26, 1999

[54] METHOD AND APPARATUS FOR THERMOFORMING THERMOPLASTIC SHEETS

[75] Inventors: Iwao Tomita, Okazaki; Takao Tamada, Hoi-gun, both of Japan

[73] Assignee: Sintokogio, Ltd., Nagoya, Japan

[21] Appl. No.: 844,163

[22] Filed: Apr. 18, 1997

[51] Int. Cl.⁶ .................................................. B29C 51/26
[52] U.S. Cl. .......................... 425/185; 425/397; 425/400; 425/DIG. 48
[58] Field of Search ............................ 425/398, DIG. 48, 425/185, 397, 400; 269/111, 237, 118, 119

[56] References Cited

U.S. PATENT DOCUMENTS

| | | | |
|---|---|---|---|
| 3,600,746 | 8/1971 | Kostur | 425/383 |
| 3,914,103 | 10/1975 | Dean et al. | 425/397 |
| 4,097,035 | 6/1978 | Shuman | 269/121 |
| 4,666,544 | 5/1987 | Whiteside et al. | 156/212 |
| 4,938,678 | 7/1990 | Oulman | 425/397 |
| 5,562,933 | 10/1996 | Shuman | 425/388 |

FOREIGN PATENT DOCUMENTS 51-27259  8/1976  Japan.

*Primary Examiner*—James P. Mackey
*Attorney, Agent, or Firm*—Limbach & Limbach L.L.P.

[57] ABSTRACT

A thermoforming machine for thermoforming thermoplastic sheets wherein molding dies are used to apply pressure to a sheet to be thermoformed. A rectangular carriage carries a frame adapted to clamp the peripheral edge of a thermoforming thermoplastic sheet. One side of the frame that is positioned downstream of the carriage is adapted to open so as to have the carriage pass through the molding dies. The carriage is removed from the sheets so as to be pulled back upstream of the molding dies while the operation of the molding dies is carried out for the sheet. The fully pulled back carriage can be used for the following sheet.

7 Claims, 4 Drawing Sheets

METHOD AND APPARATUS FOR THERMOFORMING THERMOPLASTIC SHEETS

FIELD OF THE INVENTION

This invention in general relates to an apparatus for thermoforming thermoplastic sheets, and more particularly, to an apparatus of this kind incorporating an improved frame for supporting a thermoplastic sheet to be formed.

BACKGROUND OF THE INVENTION

Thermoforming machines to form a thermoplastic sheet by the use of heat and pressure are well known in the art. Conventionally, such a machine is provided with a sheet carriage for conveying a thermoplastic sheet from a heater unit to a pressing unit. In Japanese Patent No. 51-27259 a rectangular thermoplastic sheet to be formed is supported on a sheet carriage in which there is a rectangular frame for clamping the peripheral edge of the sheet. The thermoplastic sheet supported on the carriage is first positioned in the heater unit for heating the sheet to thereby soften it. After the heating step is completed, the sheet supported on the carriage leaves the heater unit and is moved to the pressing unit, wherein the heated and softened sheet is pressed by a pair of molding dies into a desirable fixed shape. In this pressing process, the molding dies are positioned within the carriage. The carriage and its associated sheet need to move in unison during the heating and pressing processes since the carriage clamps the sheet.

A principal disadvantage of the thermoforming machine of the type discussed above is that the carriage cannot be pulled back from the pressing unit while the pressing process is being carried out, since its frame, which clamps the sheet, cannot be moved as the sheet is pressed by the molding dies. Thus, the carriage is an idling condition during a considerable period of the pressing process, and cannot be used for a following sheet during the pressing process for the preceding sheet held on the carriage. This results in a longer time for each operating cycle for thermoforming. It is very important that all processes be accomplished without any idling time.

SUMMARY OF THE INVENTION

The present invention provides an apparatus and a method for thermoforming thermoplastic sheets, which allows reduced time for each operating cycle of the apparatus.

In accord with the present invention, a frame is provided which is designed to move independently of its associated sheet. Thereby it can be pulled out from a location where the molding dies tightly grip the sheet when the dies are acted upon by a pressure acting on the sheet.

In one aspect of the present invention, an apparatus for thermoforming thermoplastic sheets is provided. This apparatus comprises means for heating a thermoplastic sheet; forming means, located downstream of said heating means in the processing direction of the sheet, for forming the heated thermoplastic sheet, said forming means having a pair of molding dies for gripping the sheet in a direction substantially perpendicular to the surfaces of the sheet so as to apply mechanical pressure to the sheet; conveying means, movable in and out of said forming means, for conveying the sheet from said heating means to said forming means, said conveying means including a frame member for clamping the peripheral edge of the sheet, said frame member being provided with one end positioned downstream of said frame member in the processing direction and with a transverse cross section defining a space which is larger than said molding dies, said one end of said frame member being arranged to be in a closed position and an opened position to allow it to pass by said molding dies along the processing direction when said one end is in said opened position, whereby, while said molding dies grip the sheet therebetween, said carrying means and frame member are released from the peripheral edge of the sheet to be separated from the sheet and then pulled back to said heating means in unison.

In another aspect of the present invention, a method is provided for thermoforming thermoplastic sheets. This method comprises the steps of: clamping the peripheral edge of a thermoplastic sheet by a frame member having one end arranged such that it can close and open in the plane substantially parallel to the surfaces of the sheet; heating the sheet clamped by said frame member to at least its softening temperature within the heating means; transferring the heated sheet clamped by said frame member to pass through a spaced-apart pair of molding dies located downstream of said heating means, gripping the heated thermoplastic sheet by said molding dies in a direction substantially perpendicular to the surfaces of the sheet, and then applying mechanical pressure to the sheet so as to form the sheet, wherein a space defined by a transverse cross section of said frame member is larger than that of said molding dies; whereby, while said forming step is carried out, said frame member is released from said clamping position where it engages the peripheral edge of the sheet, opening said one end of said frame member, and then pulling back said frame member toward said heating means while said molding dies pass through said opened end of said frame member for a following step.

The above and other related objects and features of the present invention will be apparent from a reading of the following description of the disclosure found in the accompanying drawings and the novelty thereof pointed out in the appended claims.

DETAILED DESCRIPTION OF THE PREFERRED EMBODIMENT

Figure 1:
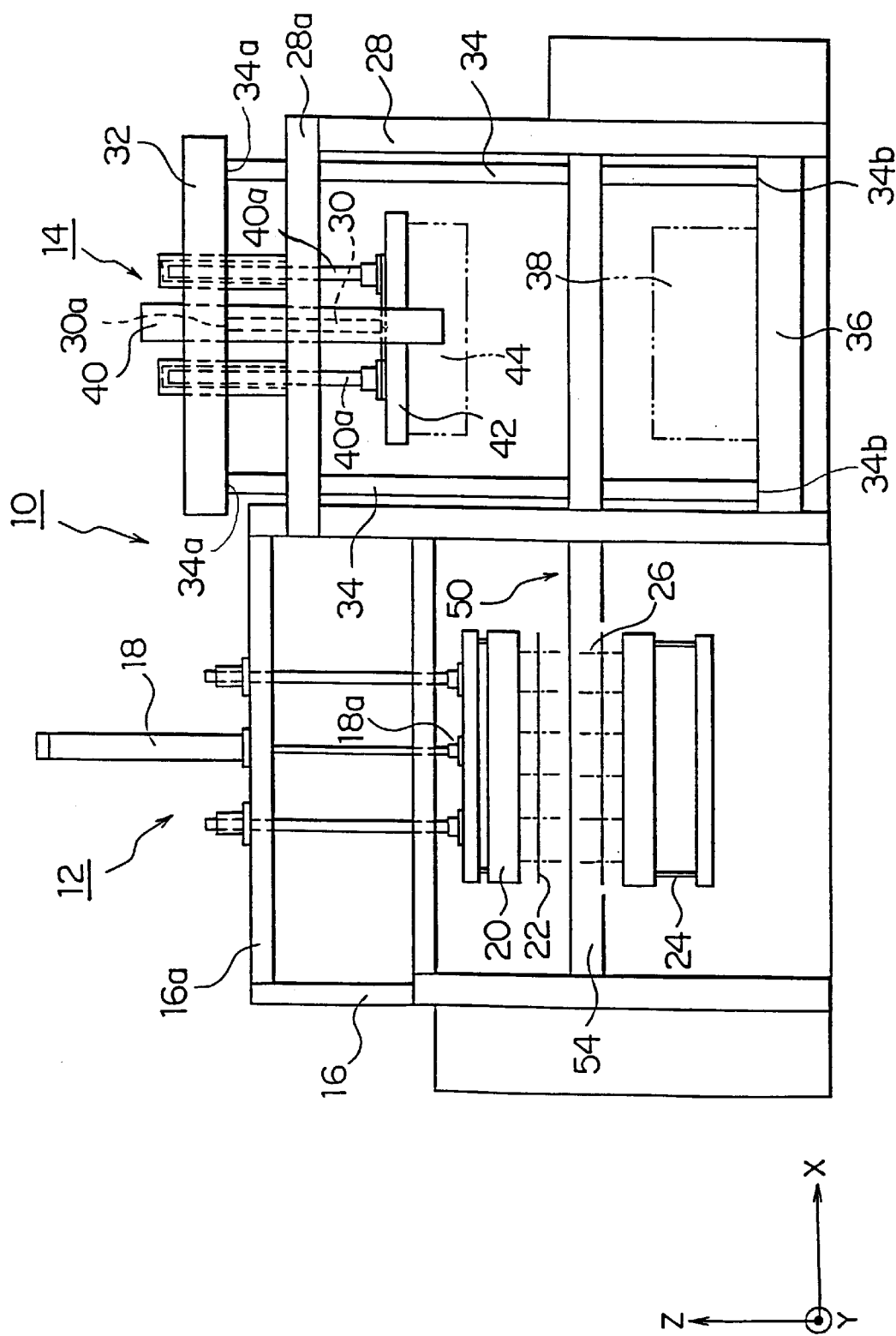
FIG. 1 is a schematic and diagrammatic elevational view of a thermoforming machine of the present invention.
Figure 2:
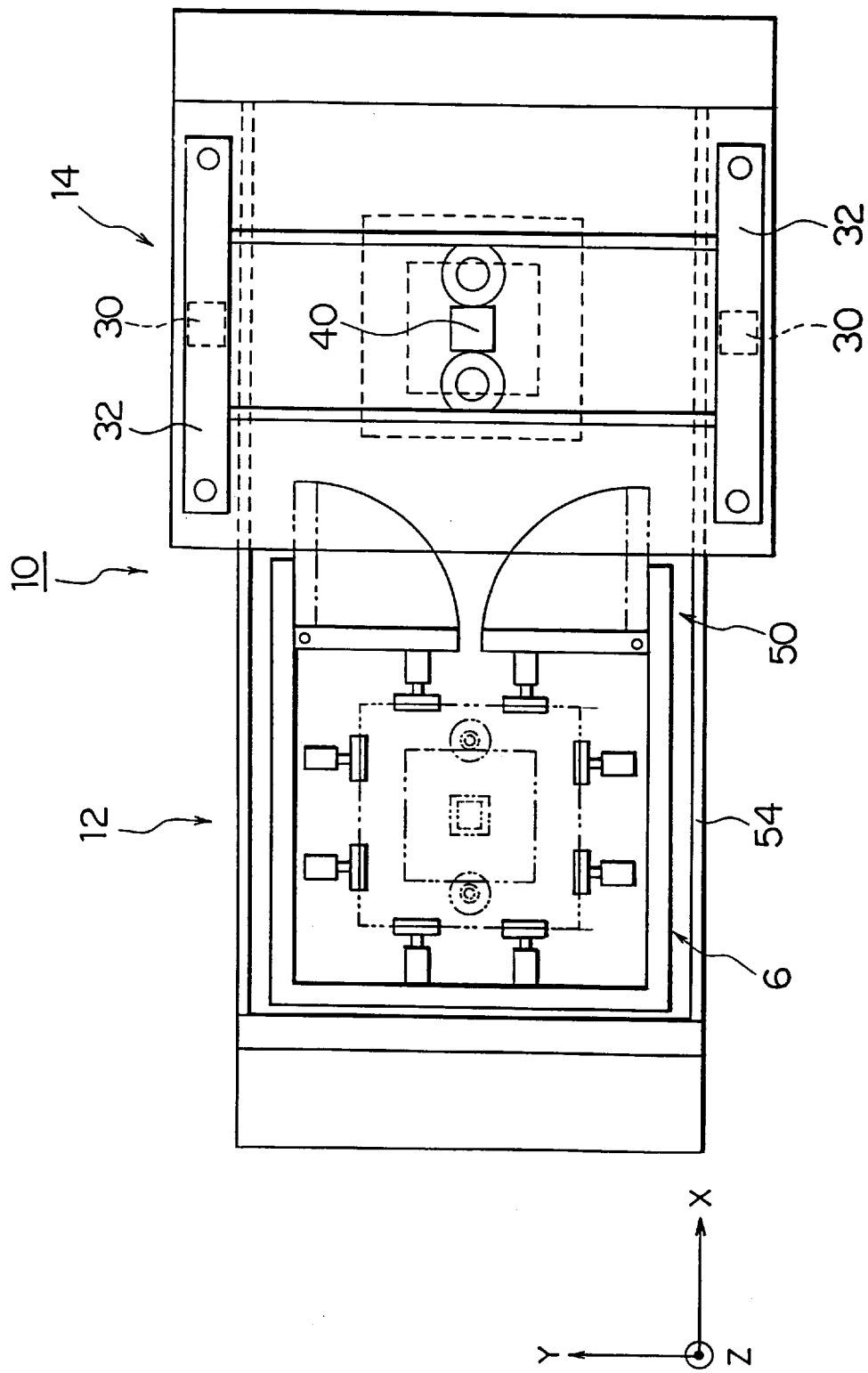
FIG. 2 is a plan view of the thermoforming machine of FIG. 1.

Referring to FIGS. 1 and 2, a thermoforming machine incorporating the present invention is identified generally by reference number 10, and comprises two processing units, namely a heater unit 12 and a pressing unit 14, to shape a thermoplastic sheet by the use of heat and pressure. First, the sheet-moving direction (the processing direction) X, the cross-sheet direction Y, and the machine-height direction Z, which is perpendicular to the directions X and Y, are defined, as shown in FIGS. 1, 2, and 3, on the left-hand sides thereof.

Figure 3:
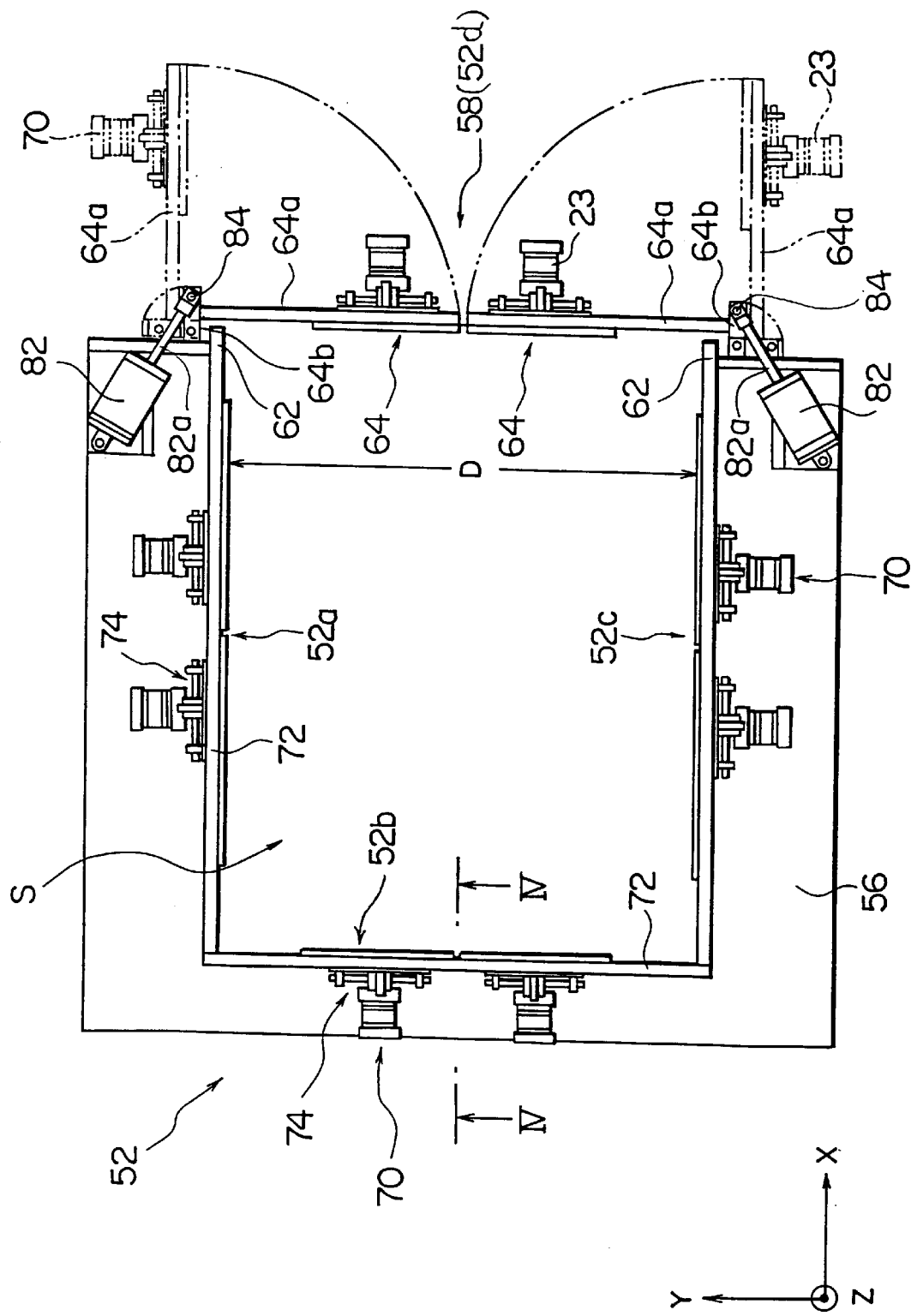
FIG. 3 is a plan view of a carriage for the thermoforming machine suitable for use with the present invention.

As shown in FIG. 3, a rectangular sheet S to be formed, which extends substantially parallel to an X–Y plane, is drawn into the thermoforming machine 10 along the sheet-moving direction X. It can be appreciated by those skilled in the art that the sheet S can be comprised of suitable thermoplastic material which is typically manufactured, and is supplied to the thermoforming machine 10 by any conventional source.

Referring now to FIGS. 1 and 2, the heater unit 12 is shown to comprise a framework 16, which is provided with a down-stroke cylinder 18, mounted in the central part of the ceiling 16a of the framework 16. A vertically movable upper heater table 20, with a louvered shutter 22, is secured to the distal end of the piston rod 18a of the cylinder 18. A lower heater table 24, with a louvered shutter 26, is fixed below the upper heater table 20 in the direction Z. While the present invention is described with reference to a typical heater unit such as the heater unit 12, those skilled in the art will appreciate that any type of heater unit is contemplated wherein the sheet can pass through the space between the upper and lower heater elements.

The pressing unit 14 includes a framework 28, positioned adjacent the heater framework 16 of the heater unit 12, downstream of the latter. The framework 28 is provided with defined "front" and "rear" (in the direction vertical to the surface of the drawing) cylinders 30 mounted on the front and rear end portions of the ceiling 28a of the framework 28. The pressing unit 14 also includes a vertically movable framework 32, which is connected to move vertically on each top end of a piston rod 30a of the cylinders 30. Four guide rods 34, whose upper ends 34a are secured on four corners of the underside of the vertically movable framework 32, extend downwardly through the ceiling 28a of the framework 28. A vertically movable lower plate 36 is secured to the lower end 34b of each guide rod 34. A lower molding die 38 is mounted on the lower table 36. Similarly to the heater framework 16, the pressing framework 28 is provided with a down-stroke cylinder or main pressing cylinder 40 mounted on the central portion of the ceiling 28a of the framework 28. A vertically movable upper plate 42, which corresponds to the lower plate 36, is secured to move vertically in the distal end of the piston rods 40a of the main cylinder 40. An upper molding die 44, which corresponds to the lower molding die 38, is mounted on the underside of the upper plate 42 opposite the lower molding die 38.

The thermoforming machine 10 also comprises a carriage assembly 50, which includes a rectangular frame 52, and is mounted on a pair of guide rails 54 by way of wheels (not shown) so as to be reciprocally guided between the heater unit 12 and pressing unit 14 along the sheet-movement direction X. The guide rails 54 extend through the heater and pressing units 12 and 14 in the sheet-moving direction X and are fixed to the frameworks 16 and 28 at a level positioned between upper and lower heater tables 20 and 24 in the machine-height direction Z.

As can be seen in FIG. 3, the frame 52 includes a substantially U-shaped, or C-shaped portion 56 having a passage opening 58 defined by its two opposed free ends 62, and a pair of substantially L-shaped pivot plates 64 having a longer portion 64a and a shorter portion 64b. Three sides 52a, 52b, and 52c of the rectangular frame 52 are defined by the U-shaped portion 56, and the fourth side, i.e., the passage 58, is defined by the longer portions 64a of the L-shaped pivot plates 64. As will be described more fully below, the pivot plates 64 function to open the passage 58 of the U-shaped portion 56 to enable the molding dies 38 and 44 to move out of the frame 52 only when needed. For this purpose, the diameter D of the passage opening 58 is larger than that of the molding dies in the cross-sheet direction Y.

Figure 4:
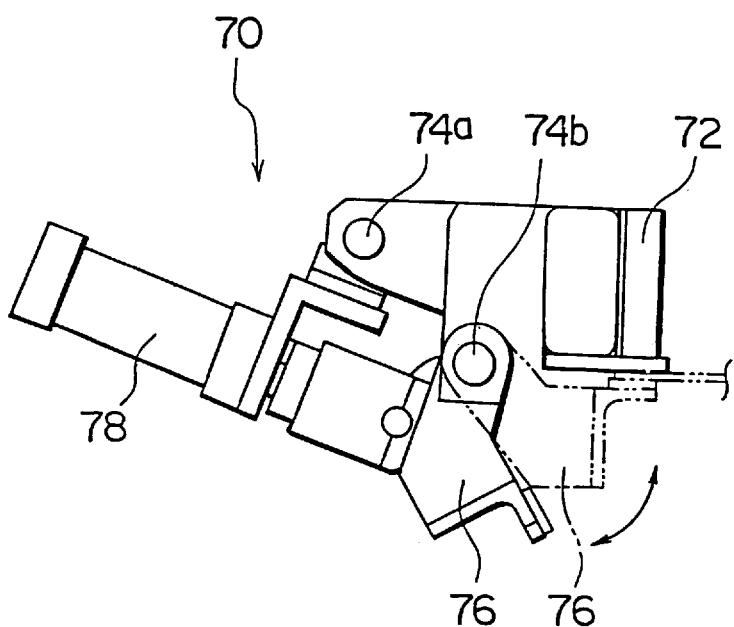
FIG. 4 is an enlarged plan view of a clamper taken in the direction of the arrows, substantially along the line IV—IV of FIG. 3.

A plurality of clampers 70 (eight clampers are shown in this embodiment) are pivotally mounted on the carriage frame 52 by way of elongated supporting plates 72 and pivot pins 74a. Further details of each clamper 70 are shown in FIG. 4. Each clamper 70 includes a clamp claw 76 for clamping the sheet to be formed and a lateral cylinder 78, which is fixed to the clamp claw 76 at the top end of the piston rod of the cylinder 78. The clamp claw 76 is pivotally mounted on the supporting plate 72 by way of a pivot pin 74b so as to pivot from an engaged position, as indicated by the solid line, where the claw 76 contacts the sheet S to be formed, to a non-engaged position, as indicated by the imaginary line, displaced from the sheet S in the direction Z by an extension of the piston rod of the cylinder 78.

Returning to FIG. 3, two lateral cylinders 82 are mounted on the carriage frame 52 near the opposed free ends of the U-shaped portion 56. Piston rods 82a of the cylinders 82 are each respectively linked to the shorter portion 64b of the corresponding pivot plate 64 by a pin 84 so that the axially reciprocating movement of the piston rod 82a is translated into the angular motion of the pivot plate 64 as it pivots about its pivotal connection (pin 84) through about 90° in the plane substantially parallel to the X–Y plane to close or open the part between the free ends of the U-shaped portion 56.

In this arrangement, the rectangular sheet S to be formed is supported on the carriage assembly 50, in which clamp claws 76 positioned at the engaged position clamp the peripheral edge of the sheet before the heating process starts. In this state, pivot plates 64 are positioned in their closed position, in which the longer portions 64a register with the open side 52d of the frame 52 as indicated by the solid line. The sheet S, supported on the carriage assembly 50, is first positioned in the heating unit 12 and heated therein to at least its softening temperature to soften it. After the heating step in the heater unit 12, the sheet S and the carriage assembly 50 are drawn to the pressing unit 14 in unison along the direction X on the guide rails 54. In the pressing unit 14, the upper and lower molding dies are closed and pressed against the surfaces of the heated and softened sheet S by the extending action of cylinders 30 and 40, to have the sheet S perfectly reproduce the thermolding dies 38 and 42. While this pressing process is in progress, and the prescribed period from the start time of the pressing process has passed, the clamp claws 76 are then moved toward the non-engaged position and displaced from the sheet S by the contraction action of the cylinders 78, so that the sheet is separated from the carriage assembly 50. Each pivot plate 64 is pivotally moved from the closed to the opened position, which open position is parallel to the sheet-moving direction X, by the contraction action of the cylinders 82. Opening the passage 58 of the frame 52 allows the carriage assembly 50 to be pulled back from the pressing unit 14 to the heater unit while the sheet is in the process of being pressed by the molding dies, since the molding dies can pass through the passage 58. In this pull-back step, the two parallel sides 52a and 52c of the frame 52 must not, of course, interfere with the molding dies 38 and 44. The preferred configuration of the frame 52 in the pressing unit 14 is such that thus the molding dies 38 and 44 are located on the center of the frame 52 in the cross-sheet direction Y.

Once the carriage assembly 50 is fully pulled back from the pressing unit 14, it can be used for the following sheet to be formed while the preceding sheet S is still in the pressing process.

While in the preferred embodiment disclosed above the carriage assembly 50 is positioned and moved on guide rails 54, it will be appreciated that the guide rails may be replaced by other suitable guide means, such as a pair of roller conveyors. The use of the roller conveyors eliminates the need for the wheels of the carriage assembly 50.

In the above embodiment, two pivot plates 64 are opened and closed to open and close the passage opening 58 in the X–Y plane. Alternatively, one or more pivot plates may be used, and their pivoting-direction is not limited to just being in the X–Y plane.

It will be apparent to those skilled in the art that various modifications and variations can be made to the apparatus of the present invention without departing from the spirit of the invention. Thus it is intended that the present invention cover modifications and variations thereof, provided that they come within the spirit of the appended claims and their equivalents.

What is claimed is:

1. An apparatus for thermoforming thermoplastic sheets comprising:

means for heating a thermoplastic sheet;

forming means, located downstream of said heating means in the processing direction of the sheet, for forming the heated thermoplastic sheet, said forming means having a pair of molding dies for gripping the sheet in a direction substantially perpendicular to the surfaces of the sheet so as to apply mechanical pressure to the sheet;

conveying means, movable in and out of said forming means, for conveying the sheet from said heating means to said forming means, said conveying means including a frame member for clamping a peripheral edge of the sheet, said frame member having a transverse cross section defining a space which is larger than said molding dies, and said frame member having at least one pivoting portion, said at least one pivoting portion being pivotable between a closed position in which the frame member surrounds the molding dies and an opened position in which the frame member can be moved away from said molding dies along the processing direction, whereby, while said molding dies grip the sheet therebetween, said conveying means with said frame member including the at least one pivoting portion in the opened position can be released from the peripheral edge of the sheet so that said conveying means with said frame member can be separated from the sheet and then pulled back to said heating means in unison, wherein the frame member comprises:

a first portion having a substantially U-shaped lateral cross section with an open side, wherein said at least one pivoting portion is connected pivotally to said first portion at said open side so as to be rotatable in the plane substantially parallel to the surfaces of the sheet to permit reciprocating movement between the closed position and the opened position with respect to said open side to allow said frame member to pass by said molding dies when said at least one pivoting portion is in said opened position.

2. An apparatus according to claim 1, wherein said frame member is further provided with a plurality of dampers mounted thereon, for clamping and releasing the peripheral edge of the sheet.

3. An apparatus according to claim 2, wherein said frame member is provided with means for rotating said at least one pivoting portion in the plane substantially parallel to the surfaces of the sheet.

4. An apparatus according to claim 3, wherein said rotating means includes a cylinder.

5. An apparatus according to claim 1, further comprising means for reciprocally guiding said conveying means between said heating means and said forming means.

6. An apparatus according to claim 5, wherein said guide means includes rails.

7. An apparatus for thermoforming thermoplastic sheets, comprising:

heating means for heating a thermoplastic sheet, pressing means for pressing the heated thermoplastic sheet to a desired form, and conveying means for conveying the heated sheet from said heating means to said pressing means, wherein said conveying means comprises:

a movable member having a body substantially C-shaped in its lateral cross section and having two free ends opposed to each other so as to define an opening therebetween, said opening facing said pressing means when said conveying means is located within said heating means;

two rotatable members, each of which is mounted on a different one of said free ends of said body for pivotal motion in a horizontal plane, said body and said rotatable members forming parts of a frame member;

a plurality of dampers mounted on said movable member for clamping the peripheral edge of the sheet;

means for angularly rotating said rotatable members in the horizontal plane through about 90 degrees; and means for transferring said movable member between said heating means and said pressing means in a reciprocating motion.

* * * * *